April 18, 1950     H. PELPHREY     2,504,578

INTERNAL GEAR SHAVING MACHINE

Filed Dec. 19, 1945     3 Sheets-Sheet 1

INVENTOR.
Harry Pelphrey.
BY
Harness, Dickey & Pierce
ATTORNEYS.

April 18, 1950     H. PELPHREY     2,504,578
INTERNAL GEAR SHAVING MACHINE
Filed Dec. 19, 1945     3 Sheets-Sheet 3
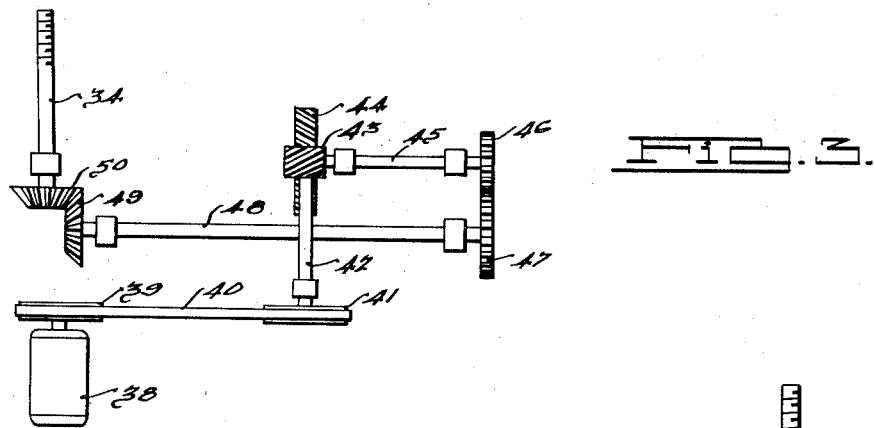
INVENTOR.
Harry Pelphrey.
BY
Harness, Dickey & Pierce.
ATTORNEYS.

Patented Apr. 18, 1950

2,504,578

UNITED STATES PATENT OFFICE 2,504,578

INTERNAL GEAR SHAVING MACHINE

Harry Pelphrey, Detroit, Mich., assignor to Michigan Tool Company, Detroit, Mich., a corporation of Michigan Application December 19, 1945, Serial No. 635,933

3 Claims. (Cl. 90—1.6)

The present invention relates to a gear shaving machine, and more particularly to a machine for shaving machine elements such as internal gears.

Various equipment is available for shaving internal gears. However, such equipment has certain disadvantages, particularly so locating the work holder in such position that set-up is difficult and visual inspection of the operation cannot be readily accomplished.

I have discovered that by locating a work holder in a conveniently accessible position and providing means whereby the cutting tool may be easily and quickly withdrawn, it is possible to reduce substantially the time required for set-up and the operator may easily check the progress of the operation at any point.

Accordingly, it is a primary object of the present invention to provide an improved machine for shaving internal gears in which the work holder is conveniently accessible, expediting the set-up and enabling the operator to visually inspect the progress of the operation.

It is also an object of this invention to provide a substantially automatic machine with which the teeth of an internal gear may be accurately and precisely shaved to exact contour and which in no way depends upon the skill or ability of the operator to produce this desirable result.

Another object of this invention is to provide a construction in which the cutter head may be quickly and easily removed from the workpiece for inspection or removal of said workpiece. To accomplish this, a quick release is provided, upon the release of which, a counterweight permits instant withdrawal of the cutting tool.

A further object of this invention is to provide a gear shaving machine wherein each stroke made by a reciprocating cutting tool is a cutting stroke. To accomplish this, the workpiece is fed for the succeeding stroke immediately at the termination of the preceding stroke of the cutting tool.

A still further object of the present invention is to provide a construction in which the pressure between the teeth of the cutting tool and teeth of the workpiece is only that exerted by the feeding of the workpiece. To accomplish this, the counterbalanced cutting tool is reciprocated in a vertical plane.

Further objects and advantages of my invention will be apparent from the description which follows when considered in connection with the accompanying drawings in which like numerals indicate like parts wherever shown and wherein:

Figure 3 is a diagrammatic sketch of the driving mechanism for reciprocating the cutting tool.

Figure 4 is a diagrammatic sketch of the driving mechanism for feeding the workpiece.

Figure 5 is a view taken in the direction of arrow 5, Figure 1, showing the serrations in the teeth of the cutting tool.

Figure 1:
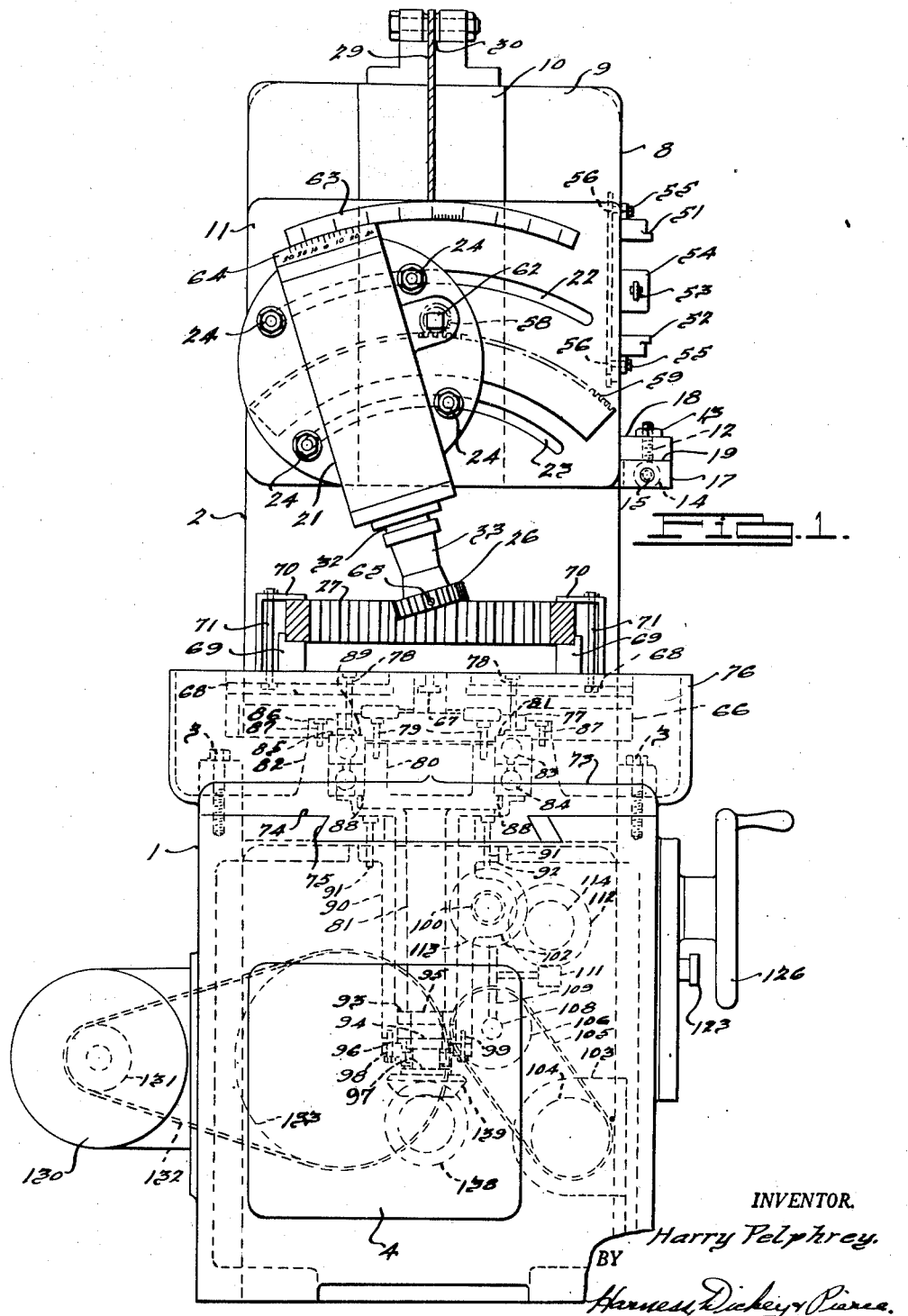
Figure 1 is a front elevation of an internal gear shaving machine including the improvements of the present invention.
Figure 2:
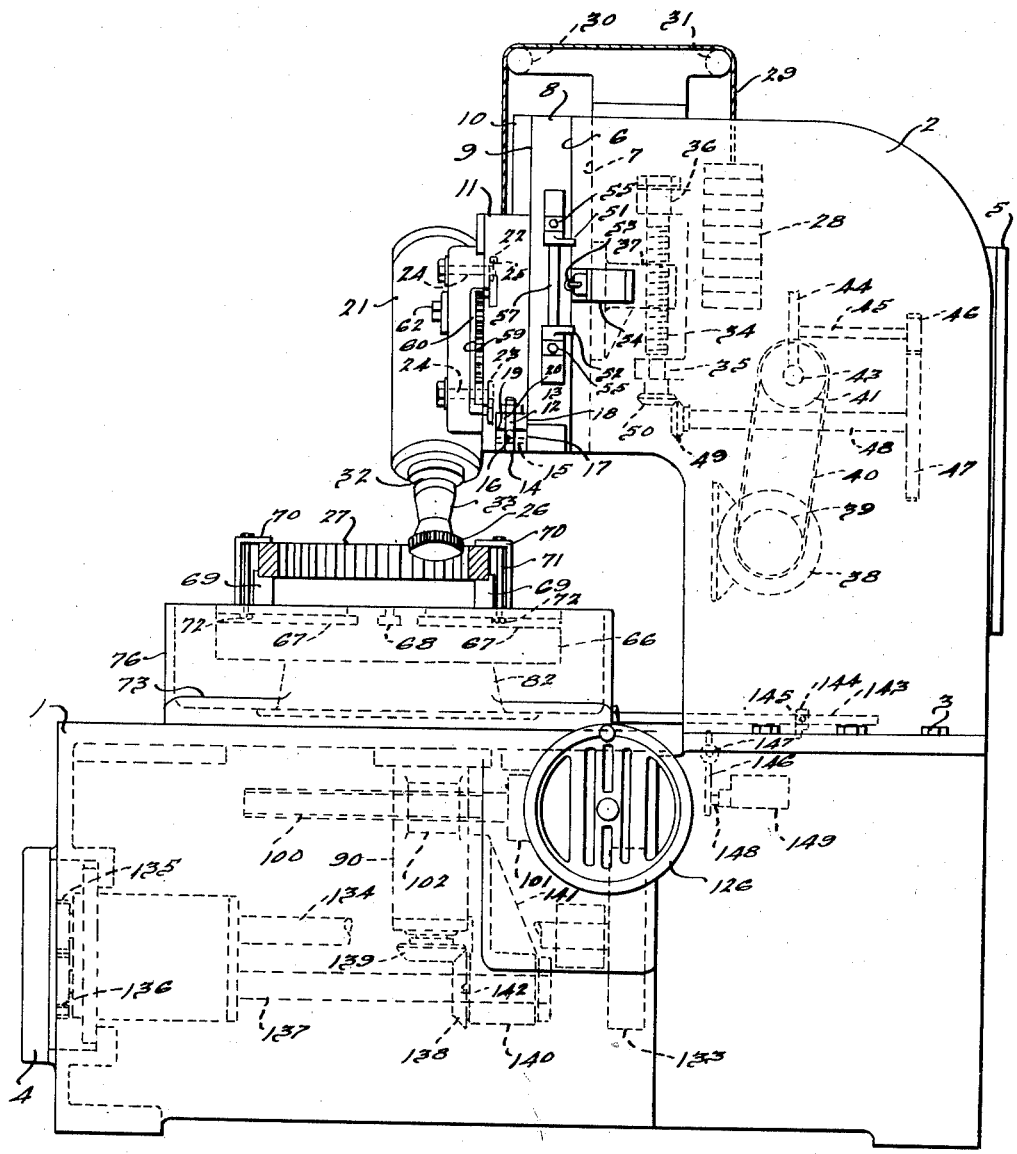
Figure 2 is a right side elevation of the machine shown in Figure 1.

With this machine, stock is removed from the contours of the teeth of an internal gear by a gear-like cutter which is reciprocated as it meshes the teeth of the internal gear while said gear is rotated about an axis parallel to the plane of reciprocation of the cutter head on which the cutting tool is mounted. Each tooth of the cutter is serrated in such a manner as to provide a series of cutting edges. Although the teeth of the tool and those of the gear are in mesh while this shaving operation ensues, the axes on which the cutter and gear are mounted are not parallel. As a result, each of the cutting edges on the serrated cutting tool reciprocates across at least some portion of the flanks of the gear teeth as said gear revolves until the teeth are shaved to exact contour.

Referring to the drawings, the machine is seen to have a two-piece base consisting of hollow integral castings 1 and 2 which are bolted together by means of a plurality of bolts 3. Doors 4 and 5 provide means by which access may be gained to certain of the hereinafter described apparatus housed interiorly of said base. Needless to say, such construction was provided in order to facilitate manufacture and this invention is not intended to be limited thereby, as it is obviously quite possible to provide a single piece casting for such base.

In order to accomplish the reciprocation of the cutting tool during the shaving operation, as described, the vertical, forward face of base portion 2 provides machined surface 6 and slideway 7 upon which a slide plate 8 is slidably mounted. This slide plate provides a further machined surface 9 and slideway 10 upon which a tool slide 11 may be slidably mounted. Such tool slide is integrally connected to said slide plate by means of clamp bolt 12 for quick release upon loosening nut 13 and rotating said bolt outwardly. Such bolt has an eye at 14 which is pinned at 15 within a slot provided therefor at 16 by the outwardly projecting ear 17, which is integrally a part of slide plate 8. Another outwardly projecting ear 18, integrally a part of tool slide 11, meets projection 17 at their common surface 19 and provides a slot 20, mating slot 16, into which bolt 12 is positioned and nut 13 tightened for rigidly and positively locking the tool slide to said slide plate. The reason for thus clamping the tool slide to the slide plate will become apparent when the means for withdrawing the cutting tool is hereinafter explained.

As a means for mounting a toolholder 21 thereto, this tool slide provides T-slots 22 and 23. Bolts 24, passing through openings therefor in the semicircular, wing-like sides of the toolholder, threadably engage T-nuts 25 in said T-slots, attaching said toolholder to said tool slide.

It is now seen that such described members are integrated by their respective fastenings to form a composite unit which may be termed a cutter head. It may also be observed from the foregoing that it is possible to release the tool slide from the slide plate when desired. This may occur, for example, when inspection of the progress of the operation is made. At this time, the clamp bolt may be outwardly rotated, as previously described, releasing the tool slide, whereupon the same and the toolholder may be moved upwardly thereby withdrawing the cutting tool 26 from the workpiece 27. This withdrawal of the cutting tool is facilitated by the suspended counterweight 28 which is secured to the tool slide by means of a cable or chain 29 which is supported by pulleys 30 and 31, preventing undue friction as the counterweight moves. It will now be appreciated that the tool slide and slide plate are thus releasable to permit withdrawal of the cutting tool without disturbing the slide plate which is set for reciprocation within predetermined limits.

In order to mount this cutting tool 26 to the toolholder, a spindle 32 is journaled for rotation in suitable bearings (not shown) within the annular portion of said toolholder. Such spindle has a jawed chuck 33 at its dependent end to receive, for registry between said jaws, the shank of the cutting tool, thereby rotatably attaching the same to said spindle.

With the cutting tool thus attached to the spindle, it is in readiness for reciprocation. As stated above, such reciprocation permits the serrated teeth thereon (Figure 5) to effect a shaving action on the teeth of the workpiece. This reciprocation is accomplished by means of feed screw 34. Said feed screw is journaled for rotation in bearings 35 and 36 provided interiorly of the upper base portion 2. This feed screw threadably engages a lead nut 37 anchored to the rear of slide plate 8 and it will be appreciated that as said feed screw rotates, the lead nut must travel thereon, shifting the described cutter head, and with it, the cutting tool.

In order to rotate the feed screw, a driving means, independent of other driving means to be later described, is provided. Such driving means has a prime mover in the form of an electric motor 38. Motor 38 drives pulley 39, continuous belt 40, pulley 41, and shaft 42 on which worm 43 is mounted. Worm 43 meshes worm gear 44, driving shaft 45 and gear 46. Gear 46 meshes gear 47, driving shaft 48 and bevel gear 49 which meshes bevel gear 50 mounted on feed screw 34, rotating the same. It is pointed out that gears 46 and 47 may be changed in order to change the rotative speed of said feed screw and thereby reciprocate the cutting tool as desired.

Automatic reciprocation of the cutting tool is accomplished by means of dogs 51 and 52, which contact arm 53 on limit switch 54. Such dogs are adjustably mounted to the slide plate by means of bolts 55 which threadably engage T-nuts 56 within T-slot 57. As each dog reaches its respective limit of travel, it contacts the arm on said switch, effecting the reversal of the direction of rotation of the motor. This, of course, reverses the rotation of the feed screw serving to cause the slide plate to move in an opposite direction.

It is obvious that in order to effect cross-axis shaving of the workpiece, this reciprocation of the cutting tool cannot begin until either the cutting tool or workpiece is angularly adjusted to bring their axes into non-parallel relationship. With this machine, the cutting tool is adjusted angularly with respect to the plane of reciprocation of the cutter head and thereby it is also angular with respect to the axis of rotation of the workpiece, thereby accomplishing the desired condition. Such adjustment is accomplished by means of a rotatable pinion 58 which meshes a sector 59. Inasmuch as said pinion is mounted upon shaft 60 journaled for rotation in the toolholder, and said sector is anchored to the tool slide, it will be appreciated that rotation of said pinion will serve to cause angular shifting of the toolholder and cutting tool. Such rotation may be readily brought about by turning the squared end 62 on the opposite end of the shaft by means of a wrench. It is pointed out that the previously described T-slots in the tool slide are arcuately shaped in order that the bolts and T-nuts may slidably move as such adjustment progresses. When the cutting tool is in predetermined angular position, it is, of course, locked therein by tightening said bolts.

Such angular positioning is accurately controlled by means of the graduations indicated at 63 and 64. The angle thus indicated is measured from a point 65 centrally of the cutting tool and represents the extent of the angular displacement of said tool required to insure meshing of the teeth thereon with the teeth on the workpiece.

To complete the description of this reciprocation of the cutting tool, the extent of such is pointed out. Previously, it was stated that the dogs on the slide plate are positioned to permit reciprocation within predetermined limits. At this place, such limits will be described.

In order to ascertain that the cutting tool covers the width of the gear, the slide plate must reciprocate a distance sufficient to permit the central point 65, on said cutting tool, to emerge from the gear on each stroke. That is to say, this point must emerge on the up stroke and on the down stroke. This stroke, of course, may be determined during the set-up, and the dogs on the slide plate adjusted accordingly.

In order to mount workpiece 27 to be thus engaged by the cutting tool, work holder 66 is provided. Such work holder has T-slots 67 and 68 spaced to divide the upper surface of said work holder into four quadrants. The workpiece may be placed upon spacers 69, raising the workpiece off said surface to an extent sufficient to permit the cutting tool to emerge from the workpiece as stated above and also to prevent the lower end of the cutting tool from colliding with said surface as it travels downwardly. Brackets 70, having openings through which bolts 71 extend to threadably engage T-nuts 72 within said T-slots, bear with a face of one leg upon a side of the gear and with the end of the other leg upon the surface of the work holder to rigidly and positively lock said workpiece, thereto. The simplicity of this method of mounting is apparent, inasmuch as the cutting tool may be moved upwardly in the manner described, leaving the work holder entirely clear of all obstacles and open to the operator.

Mounted in this manner, the workpiece is rotated about an axis parallel to the plane of reciprocation of the cutter head and fed in a plane normal to said plane to the reciprocating cutting tool as the shaving operation progresses.

To provide for such rotation and feeding of the workpiece, the work holder is rotatably mounted in a slidable carriage 73 slidably mounted upon machine surface 74 and slideway 75 on the horizontal surface of lower base portion 1. This carriage has an annular, upwardly-directed wall, forming chip pan 76 interiorly of which said work holder is mounted in the following manner. An annular bearing plate 77 is anchored by means of bolts 78 to the bottom of said work holder. Such bearing plate is in turn anchored by bolts 79 to the annular rim 80 which is integral with shaft 81. Within pan 76 of said carriage, an upwardly-directed annular boss 82 is formed. Such boss is hollow and accommodates ball bearings 83 and 84, the outer races of which abut the inner surface of said boss and are retained therein by means of shoulder 85 and cap 86 which is secured to said boss by bolts 87. The inner races of said bearings abut the annular exterior surface of rim 80 and rest upon a shoulder 88 on said rim. At the top, a shoulder 89, of the previously described bearing plate 77 rests upon the upper surface of the upper bearing. Centrally of this boss 82, an opening is provided to receive the upper end of a hollow, annular casing 90 anchored to depend from the lower surface of said carriage by means of bolts 91 which engage tapped openings provided in the shoulder 92 thereof. This casing encloses the downwardly extending shaft 81 and provides annular thrust bearings 93 and 94 which surround said shaft with the upper surface of bearing 93 abutting shoulder 95 on said shaft. Such bearings are maintained in position by means of a retaining collar 96 which abuts the lower surface of bearing 94. This collar also abuts shoulder 97 on shaft 81 and is supported by cap 98, which cap is secured by means of bolts 99 to the lower end of the casing. Thus, the work holder is rotatably mounted upon shaft 81 and inasmuch as said shaft shifts with the carriage, such work holder is shifted therewith.

This shifting of the carriage is provided to initially position the workpiece with respect to the cutting tool and to feed the same during the shaving operation. Such shifting is accomplished by means of a feed screw 100 journaled for rotation in a suitable bearing such as indicated at 101. Feed screw 100 threadedly engages a tapped opening in an outwardly projected portion of the casing 90 thereby forming lead nut 102. It will be clear from the description that as such feed screw is rotated, the carriage and with it, the workholder must be shifted.

During the shaving operation, the carriage automatically feeds the workpiece to the cutting tool. This feeding is accomplished by means of a driving mechanism of which motor 103 is the prime mover. Such motor is automatically actuated by the previously described limit switch 53 upon each contact of such switch by dogs 51 and 52. Thus, as said switch reverses the direction of rotation of previously described motor 38 to effect reciprocation of the cutting tool, it simultaneously actuates motor 103 serving to cause the feeding of the workpiece at the end of each stroke of the cutting tool, thereby preparing for the next stroke. The extent of the feed is controlled by a timer (not shown) which controls the number of revolutions made by such motor each time it is actuated by the limit switch. It will be observed that this motor drives pulley 104, continuous belt 105, pulley 106, and shaft 107 to which worm 108 is integrally connected. Worm 108 meshes worm gear 109, driving shaft 110 and worm 111 thereon. Worm 111 meshes worm gear 112 which also has internal teeth meshing gear 113. Gear 113 meshes gear 114 attached to feed screw 101, rotating the same, and feeding the workpiece to the cutting tool.

Return of the work holder, or initial positioning of the same, is accomplished manually. For this operation, gear 113 is taken out of mesh with the internal teeth of worm gear 112, freeing the feed screw of its driving mechanism for manual rotation. Such gear 113 is slidably held on its supporting shaft 115 and provides a groove 116 in the hub thereof which receives pins 117 (only one of which is shown in Figure 4), carried by the shifter fork 118. Such fork is pivoted at 119 and provides an integral lever 120 by means of which it may be rotatably moved about its pivot point thereby slidably moving gear 113 on shaft 115. A compression spring 121 forcibly bears against a face of the lever at its free end, preventing disengagement of gears 112 and 113 unless pin 122, bearing on the opposite face of said free end of the lever is moved inwardly, causing the lever to rotate the fork outwardly and disengage said gear 113 from said internal teeth of gear 112. When desired, such disengaging action may be easily accomplished by rotating the conveniently accessible knob 123 moving the pin 124, which is attached to pin 122, inwardly in the curved grooved slot 125 to move said pin 122 and lever inwardly, disengaging said gears as described. After release in this manner, the feed screw may be manually rotated by turning hand wheel 126 which rotates shaft 127 and bevel gear 128. Bevel gear 128 meshes bevel gear 129 on such feed screw thereby rotating the same and shifting the workpiece.

In order to present the teeth on the workpiece to the cutting tool as it is thus fed thereto, the work holder is rotated. This rotation is accomplished by means of a driving mechanism now to be described. An electric motor 130 drives pulley 131, belt 132, pulley 133, and shaft 134 to which gear 135 is secured. Gear 135 meshes gear 136 thereby driving shaft 137 and bevel gear 138 which is slidably keyed to shaft 137. Such bevel gear 138 meshes bevel gear 139 secured to shaft 81, upon which said work holder is mounted, rotating the same and the workpiece therewith. It is pointed out that gears 135 and 136 may be changed to permit rotation of the workpiece at any desired rate.

Inasmuch as bevel gear 139 shifts as shaft 81 moves with the carriage, it is obviously necessary to provide for keeping such gear continuously in mesh with gear 138. Consequently, gear 138 is slidably mounted on shaft 137. Sliding movement is imparted to such gear by a bearing 140, supporting shaft 137 at one end thereof, which bearing is integrally connected to the previously described casing 90 by means of the bracket 141. Thus, such bearing is also shifted with the carriage and provides an annular shoulder 142 which bears upon the adjacent face of gear 138, propelling said gear as the carriage is shifted to feed the work holder. When the carriage is returned, the bevel gear 139 on shaft 81, meshing gear 138, serves to cause said gear to slidably move in the return direction.

It will now be appreciated that as the rotating workpiece is fed to the reciprocating cutting tool, rotation will be imparted to said tool as the teeth thereon mesh those on the workpiece and the crossed-axis relationship of the tool and the workpiece will serve to cause the teeth on said workpiece to be shaved exactly to the desired contour. It will also be apparent that by feeding the workpiece on each stroke of the cutting tool, the operation will be rapidly finished.

When the desired amount of stock has been removed from the workpiece, that is to say, at the completion of the operation, the machine is automatically stopped. For this purpose, a boom or outrigger 143 is attached to carriage 73 and a dog 144 slidably mounted thereon. Such dog may be positioned to permit the carriage to feed the desired amount and then locked thereat by means of a set screw 145 which prevents further movement on the boom. This dog meets lever 146 which is pivoted at 147 to press upon contact 148 of limit switch 149. When this occurs, the limit switch stops the supply of electric current to the driving motors, stopping the machine, at which time the operator may remove the workpiece, replacing it with another before re-starting the machine for a repetition of the operation.

It will be clear from the foregoing description that the shaving machine shown in the drawings and described above has been illustrated and described in rather specific detail. Obviously, many modifications, changes, and departures from the above described construction may be made without departing from the generic spirit and scope of the invention as set forth in the subjoined claims.

What is claimed is:

1. A machine for shaving internal gears in combination with a base, a work holder, a reciprocable slide plate to be reciprocated within predetermined limits, means to effect reciprocation thereof, a tool slide releasably mounted on said plate for slidable movement thereon, a toolholder secured to said tool slide adapted to retain a cutting tool, a quickly releasable fastener operatively associated with said slide plate and tool slide whereby said tool slide may be rapidly released and refastened when desired without affecting the slide plate, and means including a supplemental slide operatively interconnecting said tool slide and slide plate to permit withdrawing said cutting tool relative to said work holder.

2. A machine for shaving internal gears in combination with a base, a work holder, a reciprocable slide plate to be reciprocated within predetermined limits, means to effect reciprocation thereof, a tool slide releasably mounted on said plate for slidable movement thereon, a toolholder secured to said tool slide adapted to retain a cutting tool, quickly releasable fastener means including an outwardly rotatable clamp bolt operatively associated with said slide plate and toolholder to permit quick release of said tool slide without affecting the slide plate, and a counterweight operatively associated with said tool slide for effecting the same to move slidably upon the slide plate for withdrawing the cutting tool relative to said work holder.

3. A machine for shaving internal gears in combination with a base, a slidable carriage comprising a chip pan mounted thereon, a hollow centrally located boss therein, a circular aperture therethrough, an annular casing, the upper portion of which is received for registry within said aperture, a shoulder on said casing, a plurality of bolts attaching said casing to a lower surface of said slidable carriage, a shaft within said casing, an annular rim integrally a part of said shaft disposed at its upper end within said hollow boss, an annular bearing plate integrally connected to the upper part of said rim, an annular work holder mounted thereon, roller bearing assemblies disposed between the exterior surface of said rim and the interior surface of said annular boss to rotatably support said rim, bearing assemblies at the lower end of said shaft disposed between the exterior surface thereof and interior surface of said casing to rotatably support said lower end, a retaining collar surrounding said lower portion of said shaft to abut the lower surface of one of said bearing assemblies, a cap bolted to the lower end of said casing for retaining said collar, a bevel gear secured to the lower end of said shaft, means to mesh said gear for rotating said shaft and thereby said work holder, and means to slidably shift said carriage.

HARRY PELPHREY.

REFERENCES CITED

The following references are of record in the file of this patent:

UNITED STATES PATENTS

| Number | Name | Date |
| --- | --- | --- |
| 2,257,195 | Rovick | Sept. 30, 1941 |
| 2,280,045 | Miller | Apr. 14, 1942 |